(12) United States Patent
Nakamoto et al.

(10) Patent No.: US 8,345,187 B2
(45) Date of Patent: Jan. 1, 2013

(54) LIQUID CRYSTAL DISPLAY DEVICE

(75) Inventors: Hiroshi Nakamoto, Chiba (JP); Akiyoshi Tobe, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 449 days.

(21) Appl. No.: 12/687,143

(22) Filed: Jan. 14, 2010

(65) Prior Publication Data

US 2010/0182542 A1    Jul. 22, 2010

(30) Foreign Application Priority Data

Jan. 19, 2009    (JP) ................................. 2009-009250

(51) Int. Cl.
*G02F 1/1335* (2006.01)
*B29D 11/00* (2006.01)

(52) U.S. Cl. ............. 349/65; 349/56; 349/113; 264/1.1; 264/1.24

(58) Field of Classification Search .................... 349/56, 349/57, 61, 64, 65, 67, 112, 113; 362/97.1, 362/97.2, 97.3, 97.4; 264/1.1, 1.24, 1.25, 264/1.7, 2.7

See application file for complete search history.

(56) References Cited

U.S. PATENT DOCUMENTS

| | | | |
|---|---|---|---|
| 7,401,962 B2 * | 7/2008 | Yamashita et al. | 362/606 |
| 7,448,787 B2 * | 11/2008 | Kim et al. | 362/620 |
| 2006/0291253 A1 | 12/2006 | Kim et al. | |
| 2007/0115407 A1 * | 5/2007 | Richard et al. | 349/112 |
| 2007/0279727 A1 * | 12/2007 | Gandhi et al. | 359/242 |
| 2008/0137004 A1 * | 6/2008 | Iwasaki et al. | 349/64 |
| 2010/0182542 A1 * | 7/2010 | Nakamoto et al. | 349/65 |

FOREIGN PATENT DOCUMENTS

| | | |
|---|---|---|
| CN | 1704812 | 12/2005 |
| CN | 1877374 | 2/2006 |
| JP | 07-043710 | 2/1995 |
| JP | 07-43710 | 2/1995 |
| JP | 2005-251687 | 9/2005 |
| JP | 2006-344598 | 12/2006 |

\* cited by examiner

*Primary Examiner* — Brian Healy
(74) *Attorney, Agent, or Firm* — Antonelli, Terry, Stout & Kraus, LLP.

(57) ABSTRACT

Provided is a liquid crystal display device including: an optical switching member; a light guide panel; and a light source, the light guide panel including, on at least one of a front surface and a back surface thereof, a plurality of surface structures including: a first raised surface extending outward being formed as a free surface; a first light reflection surface entering inside from the first raised surface; a second light reflection surface extending outside from the first light reflection surface; and a second raised surface which continues from the second light reflection surface and is formed as a free surface, whereby a liquid crystal display device may be obtained, which includes a thin light guide panel with a thickness of, for example, 1 mm or less.

4 Claims, 13 Drawing Sheets

LIQUID CRYSTAL DISPLAY DEVICE

CROSS-REFERENCE TO RELATED APPLICATION

The present application claims priority from Japanese application JP 2009-009250 filed on Jan. 19, 2009, the content of which is hereby incorporated by reference into this application.

BACKGROUND OF THE INVENTION

1. Field of the Invention

The present invention relates to a liquid crystal display device.

2. Description of the Related Art

In recent years, liquid crystal display devices are widely used as information display devices for portable devices. In order to reduce the size of the portable devices, the liquid crystal display devices need to be reduced in entire thickness.

However, the liquid crystal display device is not self-luminous, and hence a planar lighting unit called "backlight" is often required. It is known that the liquid crystal display device used for portable devices employs a kind of planar lighting unit with a light source allocated on a side surface of a light guide panel in order that the thickness of the backlight can be reduced. In such planar lighting unit, the light guide panel has an appropriate structure for scattering incident light from the side surface to the front surface thereof uniformly. Further, in the planar lighting unit, there must be given a consideration to the avoidance of undesired light from being reflected on a screen.

For example, JP 07-43710 A discloses a liquid crystal display device, in which a light guide panel is provided with a plurality of grooves on a surface thereof, the plurality of grooves each having projections projecting outward on both sides of the aperture of the groove. According to the invention disclosed in JP 07-43710 A, light which has entered the projections goes outside to be diffusely reflected by a reflective member, and then enters the light guide panel again.

Meanwhile, JP 2005-251687 A discloses a liquid crystal display device, in which light sources are provided on a side surface of a light guide panel, and a light blocking member is provided on a flexible printed circuit board so as to prevent a color of the flexible printed circuit board from being mixed with colors on a screen.

In general, a light guide panel is made of a transparent thermoplastic resin, such as polycarbonate or polymethylmethacrylate, and is formed through projection molding. However, when the projection molding method is employed, it has been difficult to obtain a light guide plate with a thickness smaller than a certain degree, for example, the thickness of 1 mm or less, due to the reason that the resin is insufficiently filled into the mold or it is difficult to remove the finished product from the mold.

SUMMARY OF THE INVENTION

The present invention has been made in view of the above-mentioned circumstances, and it is an object of the invention to provide a liquid crystal display device which includes a thin light guide panel with a thickness of, for example, 1 mm or less.

Among aspects of the invention disclosed in the present application, the representative ones are briefly described as follows.

(1) A liquid crystal display device, including: an optical switching member which includes a first substrate and a second substrate sandwiching a liquid crystal layer; a light guide panel made of a thermoplastic material disposed on a back side of the optical switching member; and a light source disposed on at least one side of the light guide panel, the light guide panel including, on at least one of a front surface and a back surface thereof, a plurality of surface structures including: a first raised surface extending outward from the at least one of the front surface and the back surface, the first raised surface being formed as a free surface due to a flow of the thermoplastic material; a first light reflection surface which continues from the first raised surface and enters inside the at least one of the front surface and the back surface, from the first raised surface; a second light reflection surface which continues from the first light reflection surface and extends outside the at least one of the front surface and the back surface, from the first light reflection surface; and a second raised surface which continues from the second light reflection surface and further continues, from the second light reflection surface, to the at least one of the front surface and the back surface, the second raised surface being formed as a free surface due to a flow of the thermoplastic material.

(2) In the liquid crystal display device according to item (1), of the plurality of surface structures, the thermoplastic material locating outside the at least one of the front surface and the back surface is equal in volume to a void portion formed inside the at least one of the front surface and the back surface.

(3) In the liquid crystal display device according to item (1), the first light reflection surface and the second light reflection surface are formed of the thermoplastic material which has flown when the light guide panel is pressed with a mold so that the mold is brought into contact with the thermoplastic material, and the first raised surface and the second raised surface are formed of the thermoplastic material which has flown without contacting with the mold when the light guide panel is pressed with the mold.

(4) In the liquid crystal display device according to item (1), the plurality of surface structures are formed on the front surface and the back surface of the light guide panel in a linear fashion as being orthogonally oriented to each other.

(5) In the liquid crystal display device according to item (1), the first light reflection surface intersects with the at least one of the front surface and the back surface at an angle different from an angle at which the second light reflection surface intersects with the at least one of the front surface and the back surface.

According to the invention disclosed in the present application, there may be obtained a liquid crystal display device which includes a thin light guide panel with a thickness of, for example, 1 mm or less.

DETAILED DESCRIPTION OF THE INVENTION

In the following, a preferable embodiment of the present invention is described with reference to the accompanying drawings.

Figure 1:
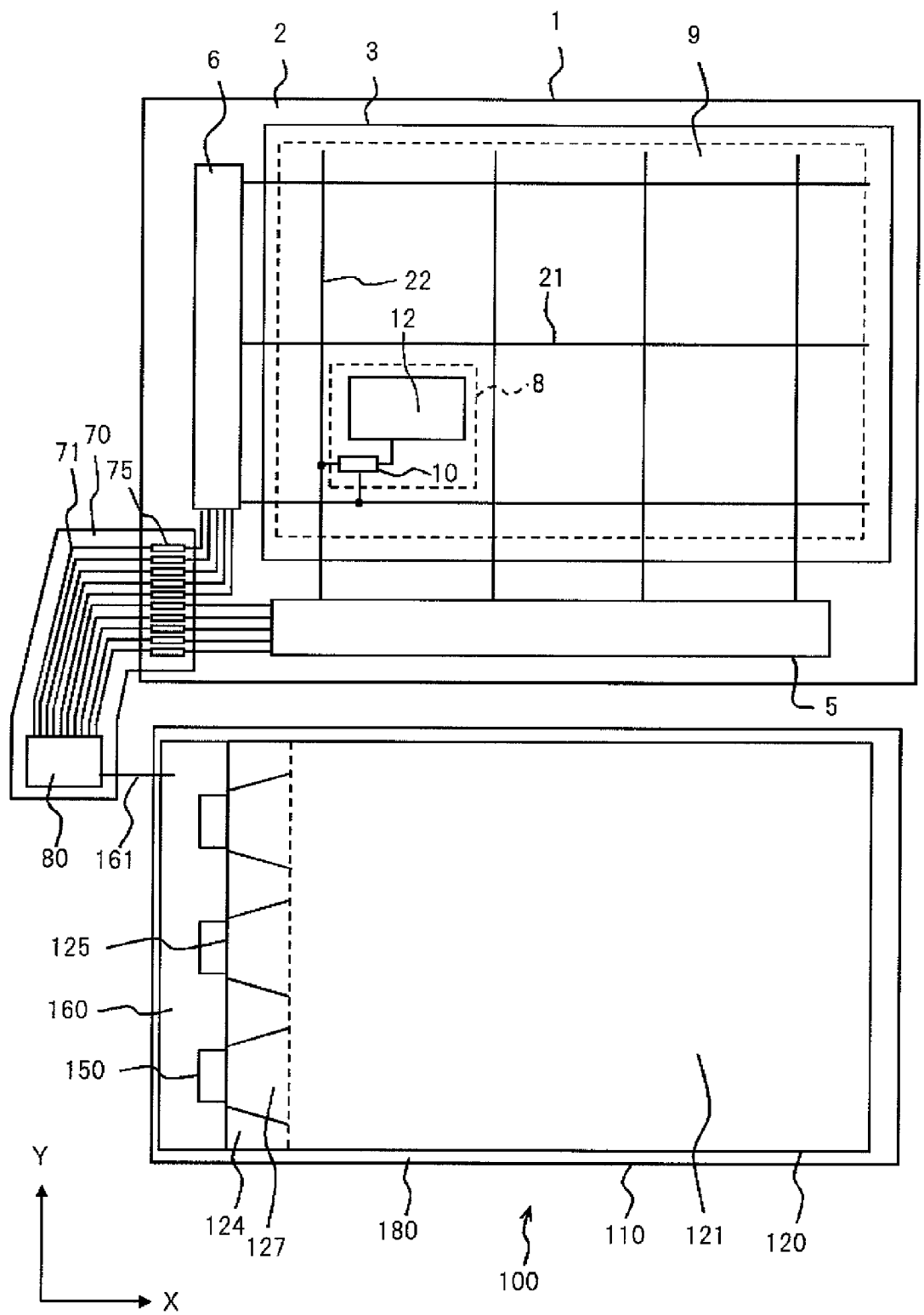
FIG. 1 is a plan view illustrating a liquid crystal display device according to an embodiment of the present invention.

FIG. 1 is a plan view illustrating a liquid crystal display device 100 according to this embodiment. The liquid crystal display device 100 includes an optical switching member 1, a backlight 110, and a control circuit 80. Signals required for display on the liquid crystal display device 100 and a power supply voltage are supplied from the control circuit 80. The control circuit 80 is mounted on a flexible substrate 70, and signals are delivered to the optical switching member 1 via wiring 71 and a terminal 75.

The backlight 110 includes a light guide panel 120, a light-emitting diode 150 which is a light source, and a housing 180. The backlight 110 is provided to irradiate the optical switching member 1. In the optical switching member 1, displays are performed by controlling an amount of transmitted light which is radiated from the backlight 110. The backlight 110 is provided in an overlaid state on the optical switching member 1 when viewed from a viewer, but in FIG. 1, the backlight 110 is juxtaposed with the optical switching member 1 for ease in understanding. It should be noted that, hereinafter in this specification, a direction in which the liquid crystal display device 100 faces a viewer is referred to as front side while a direction opposite thereto is referred to as back side, and a surface of the liquid crystal display device 100 on the front side is referred to as front surface while another surface thereof on the back side is referred to as back surface. The backlight 110 is generally disposed on the back side of the optical switching member 1, whereas the backlight 110 may be disposed on the front side alternatively. When the backlight 110 is disposed on the front side, the optical switching member 1 controls the amount of reflected light which is radiated from the backlight 110.

The light guide panel 120 has a substantially rectangular form, and the light-emitting diode 150 is provided as being opposed to a light incident surface 125, which is a side surface of the light guide panel 120. Reference numeral 160 denotes a flexible substrate for electrical connection among a plurality of light-emitting diodes 150. The flexible substrate 160 and the control circuit 80 are electrically connected to each other by wiring 161.

Light that has entered the light guide panel 120 from the light incident surface 125 outgoes from the light outgoing surface 121, which is the front surface of the light guide panel 120. An inclined surface 127 is formed between the light incident surface 125 and the light outgoing surface 121, which guides light from the light incident surface 125 to the light outgoing surface 121. The light incident surface 125 and the inclined surface 127 form a light entering portion 124, to thereby effectively transmit light from the light-emitting diode 150 to the light outgoing surface 121. It should be noted that the light incident surface 125 and the light entering portion 124 are described in detail hereinafter.

Next, the optical switching member 1 is described. The optical switching member 1 includes two substrates, namely, a TFT substrate 2 and a color filter substrate 3, and a liquid crystal composition is held between the overlaid two substrates. The TFT substrate 2 has a plurality of pixel sections 8, and a pixel electrode 12 is provided in each pixel section 8. The plurality of pixel sections 8 are aligned in a grid pattern in a display area 9. The pixel sections 8 function as optical switching elements for controlling an amount of transmitted light from the backlight 110 so as to function as pixels in the liquid crystal display device 100, to thereby form an image in the display area 9. It should be noted that, in FIG. 1, only one pixel section 8 is illustrated in order to evade complexity of the drawing.

FIG. 1 illustrates gate signal lines (also referred to as scan line) 21 extending in an X direction of FIG. 1 and provided in parallel to each other in a Y direction of FIG. 1 and drain signal lines (also referred to as video signal line) 22 extending the Y direction and provided in parallel to each other in the X direction. The gate signal lines 21 and the drain signal lines 22 intersect with each other. The pixel section 8 is formed in an area surrounded by the gate signal lines 21 and the drain signal lines 22.

A switching element 10 such as a thin film transistor (TFT) is provided in the pixel section 8. Control signals are supplied from the gate signal line 21 to turn ON/OFF the switching element 10. When the switching element 10 is turned ON, a video signal transmitted via the drain signal line 22 is supplied to the pixel electrode 12.

The drain signal line 22 is connected to a drive circuit 5, and a video signal is output from the drive circuit 5. The gate signal line 21 is connected to a drive circuit 6, and a control signal is output from the drive circuit 6. The gate signal line 21, the drain signal line 22, and the drive circuits 5 and 6 are formed on the same TFT substrate 2. A configuration is also allowable in which the drive circuits 5 and 6 and the control circuit 80 are formed on the same semiconductor chip.

It should be noted that the liquid crystal driving system in the optical switching member 1 is not specifically limited. Any publicly-known system, such as a twisted nematic (TN) system, a vertical alignment (VA) system, or an in plane switching (IPS) system, may be employed without any problem.

Figure 2A:
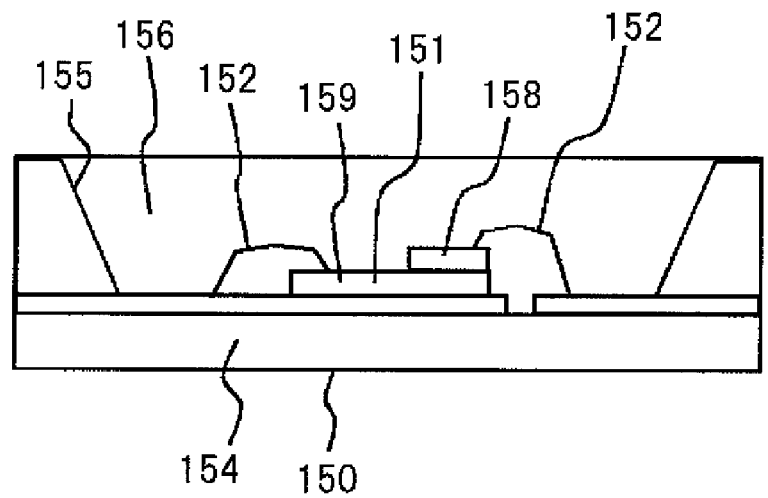
FIGS. 2A and 2B are schematic diagrams illustrating a light-emitting diode as a light source.
Figure 2B:
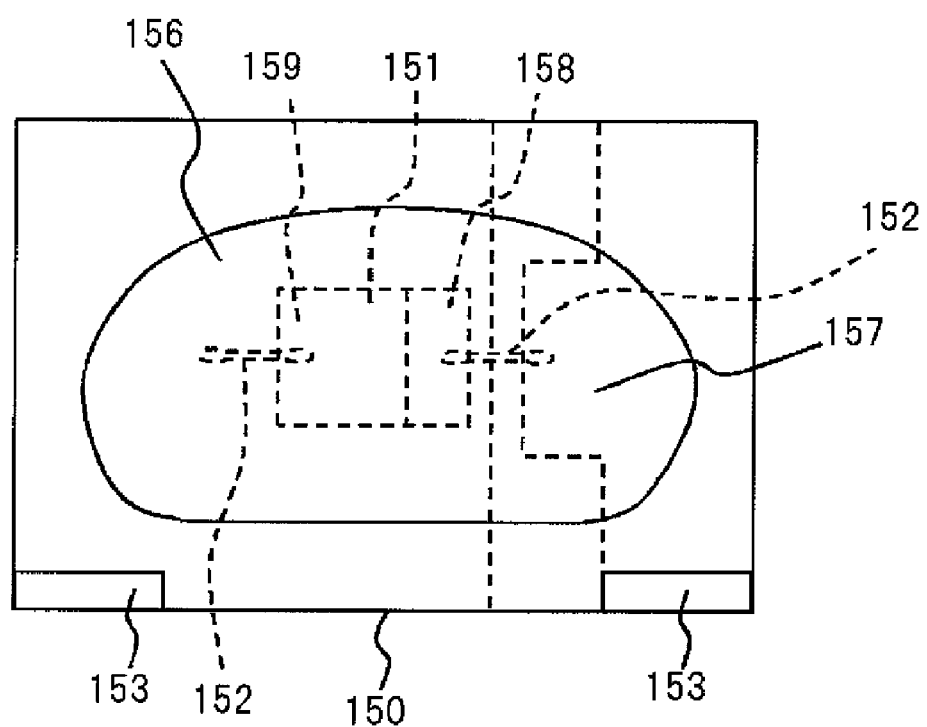

FIGS. 2A and 2B are schematic diagrams illustrating the light-emitting diode 150 as a light source. FIG. 2A is a schematic cross-section illustrating the same, and FIG. 2B is a front view illustrating the light-emitting diode 150 viewed from the light outgoing surface side.

The light-emitting diode 150 has a structure in which a light-emitting diode chip 151 as a light-emitting section is mounted on a chip substrate 154. The light-emitting diode chip 151 has a p-n junction, and when a voltage is applied to the p-n junction, light having a particular wavelength is emitted. A p electrode (anode) 158 is provided in a p-type semiconductor layer, and an n electrode (cathode) 159 is provided in an n-type semiconductor layer, those layers constituting the p-n junction.

A wire 152 is connected to each of the p electrode 158 and the n electrode 159. The wire 152 electrically connects a chip terminal 153 provided to connect the light-emitting diode 150 to the outside, to each of the p electrode 158 and the n electrode 159.

In some cases, a fluorescence emitting section 156 may be provided on the light outgoing surface side of the light-emitting diode chip 151. The fluorescence emitting section 156 has a function of converting a wavelength of light emitted from the light-emitting diode chip 151. A reflection section 155 reflects light forward. A light outgoing surface 157 from which light outgoes is formed on a front side of the light-emitting diode 150.

Figure 3A:
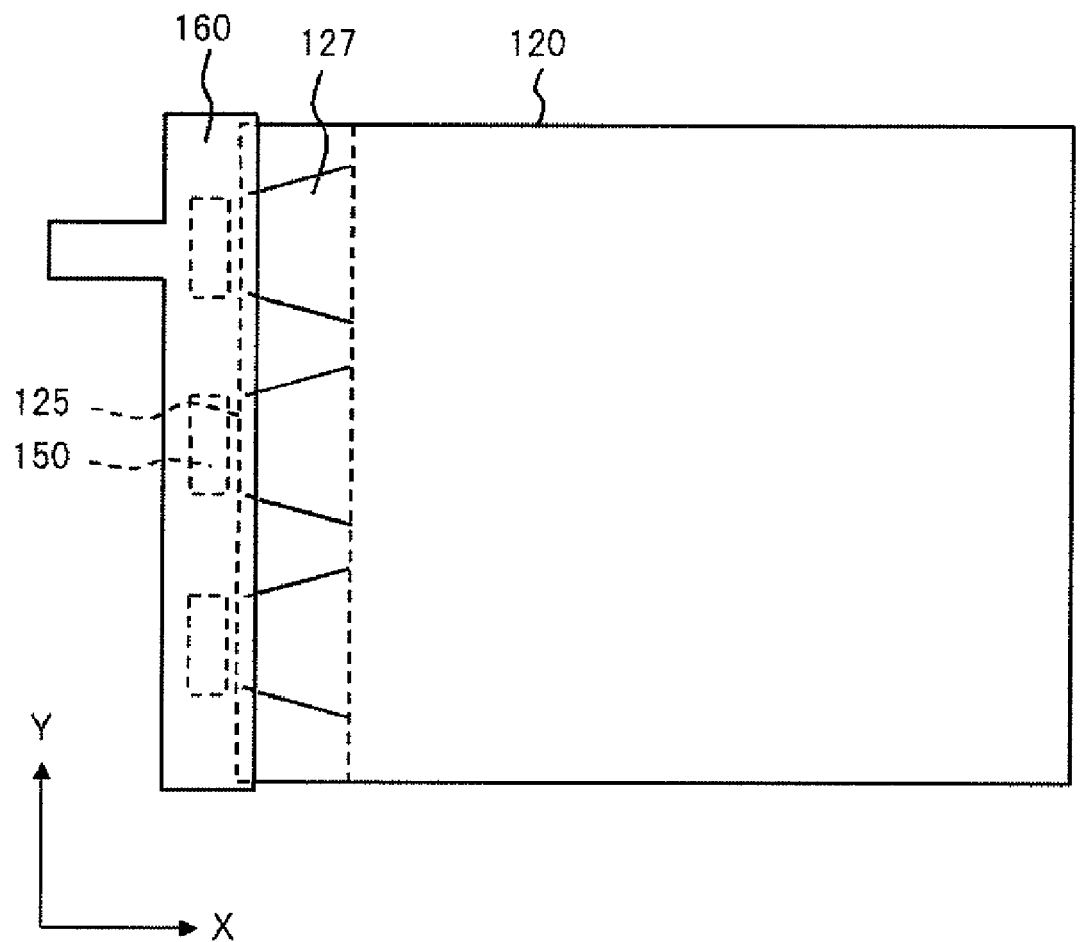
FIGS. 3A and 3B are schematic diagrams illustrating a light guide panel.
Figure 3B:
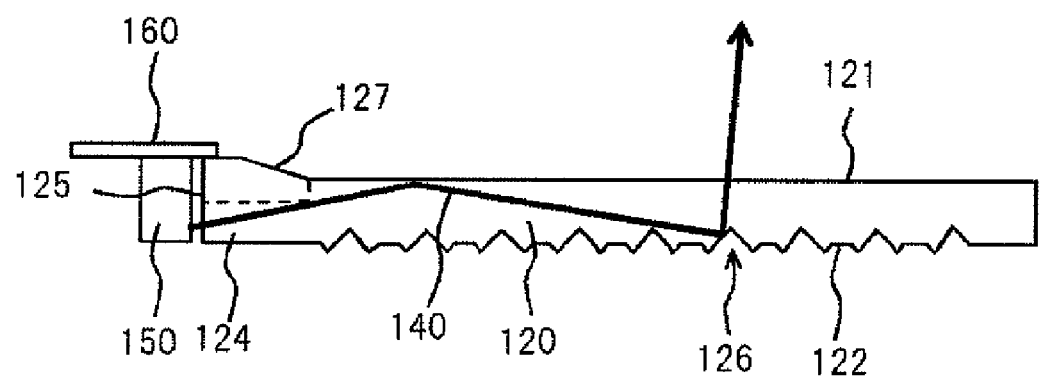

FIGS. 3A and 3B are schematic diagrams illustrating the light guide panel 120. FIG. 3A is a schematic plan view of the light guide panel 120 while FIG. 3B is a schematic cross-sectional view of the same. The light guide panel 120 has a substantially rectangular form as illustrated in FIG. 3A, and has the light outgoing surface 121 as a front surface and a back surface 122 as illustrated in FIG. 3B. The light guide panel 120 is made of an optically transmissive thermoplastic material, such as polycarbonate or polymethylmethacrylate, and has a sheet-like form. The thickness of the light guide panel 120 may preferably be in the range from 1.0 mm to 0.1 mm. In this case, the thickness of the light guide panel 120 corresponds to a distance between the light outgoing surface 121 and the back surface 122.

In FIG. 3B, a cross section of the light guide panel 120 is substantially rectangular, and the inclined surface 127 is formed so as to smoothly continue from the light incident surface 125 toward the light outgoing surface 121. Then, as illustrated in FIG. 3A, the inclined surface 127 has a fan-shaped form which opens in a direction away from the light-emitting diode 150 in the optical axis direction thereof (X direction of FIG. 3A) in a planar view of the light guide panel 120. The inclined surface 127 is effective when the thickness of the light-emitting diode 150 is larger than the thickness of the light outgoing surface 121 of the light guide panel 120.

FIGS. 3A and 3B illustrate positional relations among the light guide panel 120, the light-emitting diode 150, and the flexible substrate 160. The light incident surface 125 is provided on at least one side of the light guide panel 120, and a plurality of the light-emitting diodes 150 are provided at positions adjacent to the light incident surface 125. The light-emitting diodes 150 are arranged on the lower side of the flexible substrate 160 along the light incident surface 125.

An intermediate member such as a double sided adhesive tape (not shown) is provided on the light guide panel 120 side of the flexible substrate 160, and the light-emitting diode 150 is positioned with respect to the light incident surface 125 by adhering and fixing the flexible substrate 160 to the light guide panel 120.

Next, description is given of a light beam 140 radiated from the light-emitting diode 150 with reference to FIG. 3B. The light beam 140 radiated from the light-emitting diode 150 enters the light guide panel 120 from the light incident surface 125. The light guide panel 120 has a larger index of refraction than that of air, and hence the light beam 140 that has reached the light incident surface 125 at an angle larger than a predetermined angle with respect to the perpendicular direction of the light incident surface 125 is reflected, whereas the light beam 140 that has reached the light incident surface 125 at an angle smaller than the predetermined angle comes into the inside of the light guide panel 120.

The light outgoing surface 121 and the back surface 122 of the light guide panel 120 are substantially orthogonal to the light incident surface 125, respectively, and the light beam 140 coming into the inside of the light guide panel 120 propagates forward in the light guide panel 120 while being totally reflected on the light outgoing surface 121 and the back surface 122 of the light guide panel 120 repetitively. The back surface 122 is provided with a V-shaped groove 126 as a reflection section. A portion of the light beam 140 propagating in the light guide panel 120 is reflected toward the light outgoing surface 121 by the grooves 126 provided on the back surface 122, and outgoes through the light outgoing surface 121. The groove 126 is provided in a direction substantially orthogonal to the optical axis direction of the light-emitting diode 150.

Figure 4:
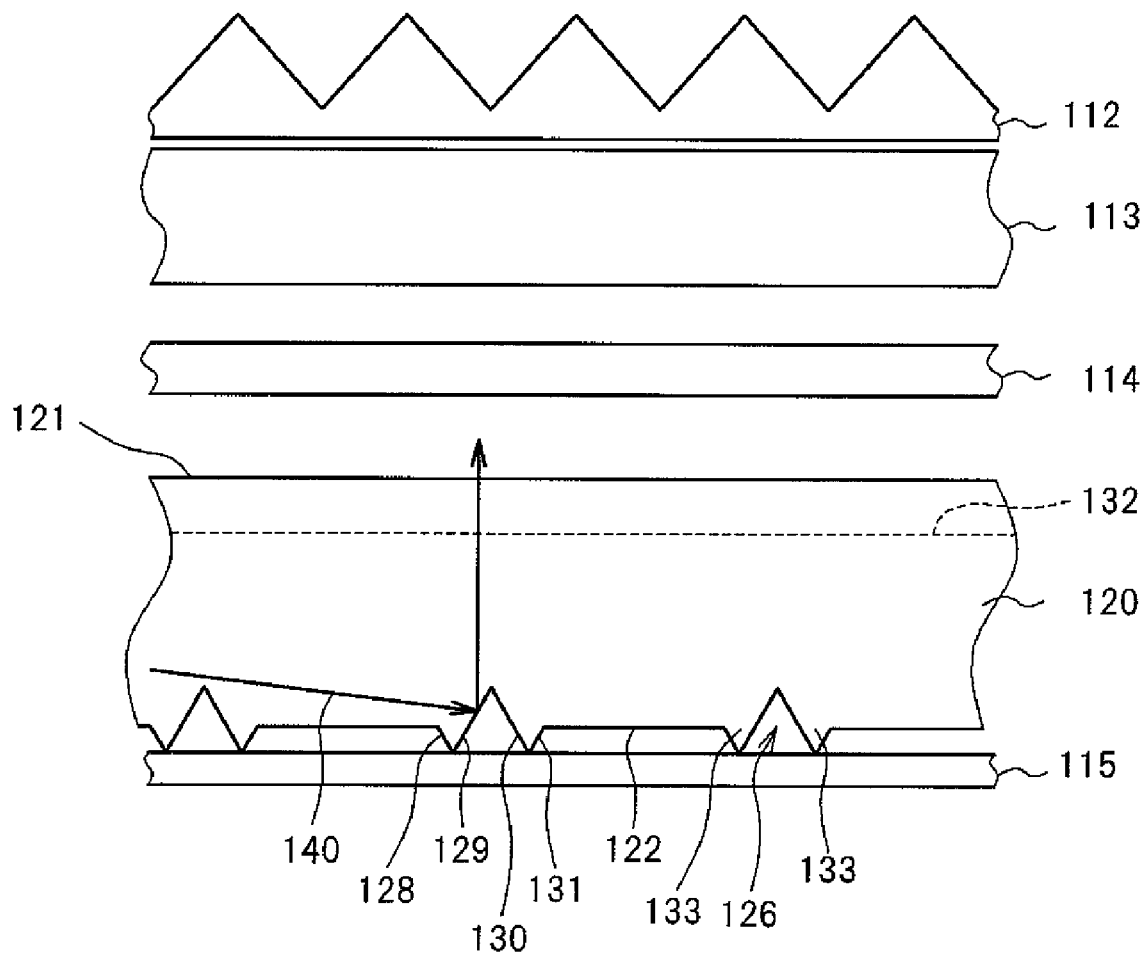
FIG. 4 is a diagram for illustrating light reflected by a groove.

Next, description is given of the light beam 140 reflected by the groove 126 with reference to FIG. 4. FIG. 4 illustrates, in addition to the light guide panel 120, prism sheets 112 and 113, a diffusion plate 114, and a reflective sheet 115. Further, the light-emitting diode 150 is assumed to be provided on the left of FIG. 4. The groove 126 is a surface structure formed on the back surface 122 of the light guide panel 120, and includes a first raised surface 128 extending outward from the back surface 122, a first light reflection surface 129 which continues from the first raised surface 128 and extends inside the back surface 122, a second light reflection surface 130 which continues from the first light reflection surface 129 and extends outward from the back surface 122, and the second raised surface 131 which continues from the second light reflection surface 130 and further continues to the back surface 122, in the stated order toward the optical axis direction of the light-emitting diode 150. The first light reflection surface 129 and the second light reflection surface 130 are each inclined by 1 to 35 degrees with respect to the back surface 122. In this embodiment, the light beam 140 that has radiated from the light-emitting diode 150 and propagated in the light guide panel 120 is reflected mainly by the first light reflection surface 129 and an angle of the traveling direction of the light beam 140 is changed so that the light beam 140 may outgo through the light outgoing surface 121. In other words, as described above, the light beam 140 propagates forward along the optical axis direction of the light-emitting diode 150 as being totally reflected repetitively in the light guide panel 120, and then the traveling direction of the light beam 140 is changed mainly by the first light reflection surface 129 to an angle at which the light beam 140 is allowed to outgo, with the result that the light beam 140 outgoes through the light outgoing surface 121 of the light guide panel 120.

It should be noted that, when the light-emitting diode 150 as a light source is additionally provided also on the right of FIG. 4, it is obvious that the second light reflection surface 130 functions similarly to the first light reflection surface 129.

Further, in this embodiment, the light outgoing surface 121 of the light guide panel 120 also has a groove 132 provided thereon. The groove 132 is a surface structure similar to the groove 126 of the back surface 122, and is formed substantially orthogonally to the groove 126. The groove 132 has a function of refracting the light beam 140 reflected by the first light reflection surface 129 toward the front side of the light guide panel 120. The light beam 140 radiated from the light guide panel 120 is diffused by the diffusion plate 114, and is changed its direction by the prism sheets 113 and 112 toward the front side of the light guide panel 120. The prism sheets 113 and 112 each are a transparent sheet having a triangular prism-shaped surface structure formed thereon, and are disposed such that the triangular prism-shaped surface structures are orthogonally oriented. The reflective sheet 115 reflects the light beam 140 that has been radiated from the light guide panel 120, toward the back surface of the light guide panel 120, to thereby guide the light beam 140 into the light guide panel 120 again. It should be noted that the prism sheet 113 and the groove 132 are similar to each other in operational effect, and hence one of the prism sheet 113 and the groove 132 may be omitted when unnecessary.

Further, in this embodiment, the light guide panel 120 is thin and easily deformed. In view of this, a convex portion 133 is formed by the first raised surface 128 and the first light reflection surface 129, or by the second raised surface 131 and the second light reflection surface 130, to thereby prevent intimate adhesion of the light guide panel 120 to the reflective sheet 115. With this configuration, there is produced an effect of suppressing unevenness in luminance distribution or light leakage, which may be caused otherwise when the light guide panel 120 is intimately adhered to the reflective sheet 115.

Figure 5:
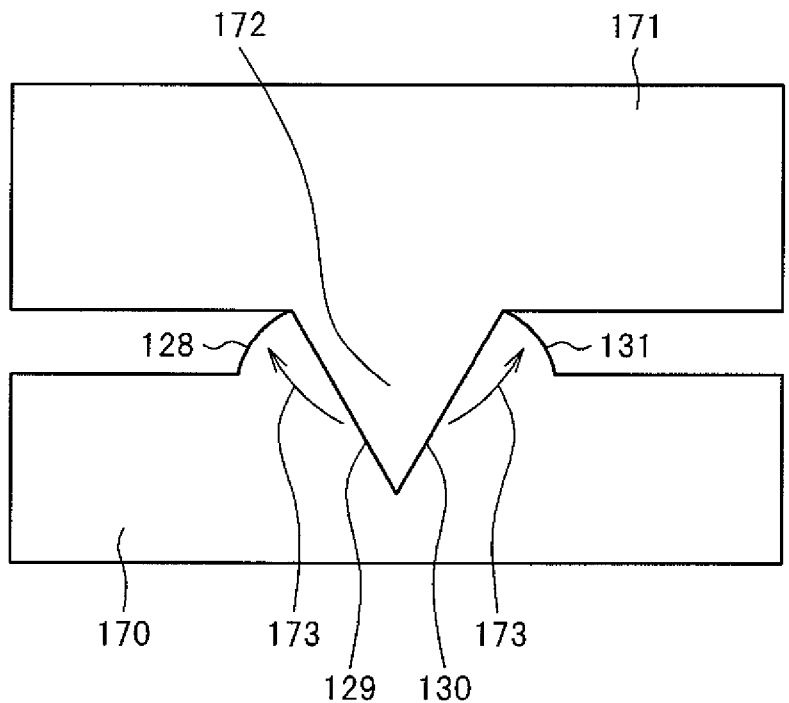
FIG. 5 illustrates a state where a mold is pressed against a sheet.

Next, description is given of a method of forming the groove 126. In this embodiment, as described above, the light guide panel 120 has a small thickness in the range from 1.0 mm to 0.1 mm, which makes it difficult to form the groove 126 through injection molding. For this reason, the groove 126 is formed by a method including the following steps. In a first step, a sheet 170 made of thermoplastic material is heated and softened (heating step). When the sheet 170 is made of a thermoplastic resin such as polycarbonate or polymethylmethacrylate, the heating temperature may be set equal to or higher than the softening point of the resin, while when the sheet 170 is made of glass, the heating temperature may be set equal to or higher than the glass-transition point of the glass. In a second step, the sheet 170 is pressed with a mold 171 (pressing step). The mold 171 may preferably be a metallic mold made of metal, and has a large number of triangular prism-shaped ribs 172 formed on the surface thereof. Then, the mold 171 is pressed such that the ribs 172 bite into the surface of the sheet 170 to a predetermined amount. FIG. 5 illustrates a state where the mold 171 is pressed against the sheet 170, in which the thermoplastic material forming the sheet 170 is pressed by the rib 172 as illustrated in FIG. 5 and flows as illustrated by arrows 173. As a result, on the one hand, the first light reflection surface 129 and the second light reflection surface 130 are formed at portions where the sheet 170 contacts the rib 172 of the mold 171 while on the other hand, the first raised surface 128 and the second raised surface 131 are formed as free surfaces at portions where the thermoplastic material forming the sheet 170 flowed to form mounds, without coming into contact with the mold 171. In a third step, the sheet 170 is removed from the mold 171 (removing step). At this time, the sheet 170 may be cooled if necessary. As is apparent from FIG. 5, according to this embodiment, the sheet 170 and the mold 171 contact each other, not across the entire surfaces thereof, but only at the ribs 172 of the mold 171. Accordingly, the sheet 170 may be removed with ease from the mold 171. Therefore, according to the method described above, the thin light guide panel 120 may be obtained from the thin sheet 170 with a thickness of about 1.0 mm to 0.1 mm.

Figure 6:
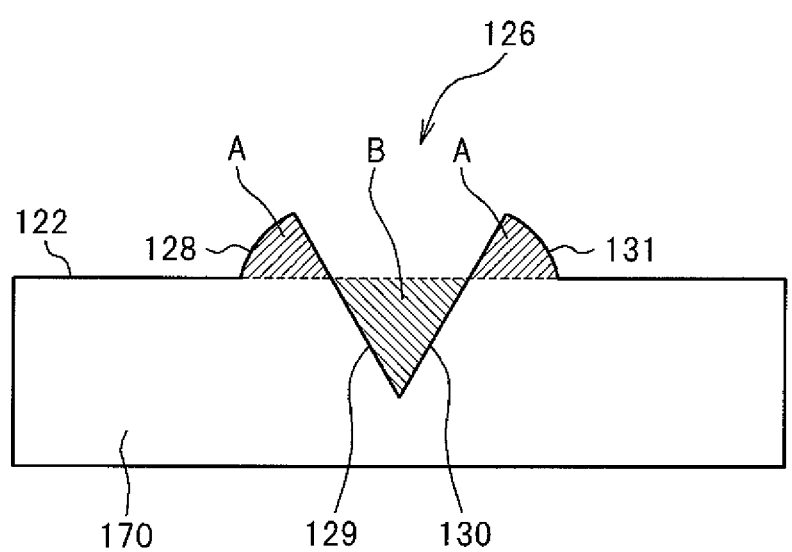
FIG. 6 is a cross-sectional view illustrating a vicinity of a light incident surface of the light guide panel.

FIG. 6 illustrates the sheet 170 removed from the mold 171. It should be noted that the sheet 170 does not change in volume thereof before and after the formation of the groove 126 by the above-mentioned method. Accordingly, when a closer look is taken at the groove 126, the thermoplastic material located outside the surface of the sheet 170, namely, outside a surface to be the back surface 122 of the light guide panel 120, that is, portions designated as A in FIG. 6, are equal in volume to a void portion that falls inside the back surface 122, namely, the portion designated as B in FIG. 6.

Figure 7:
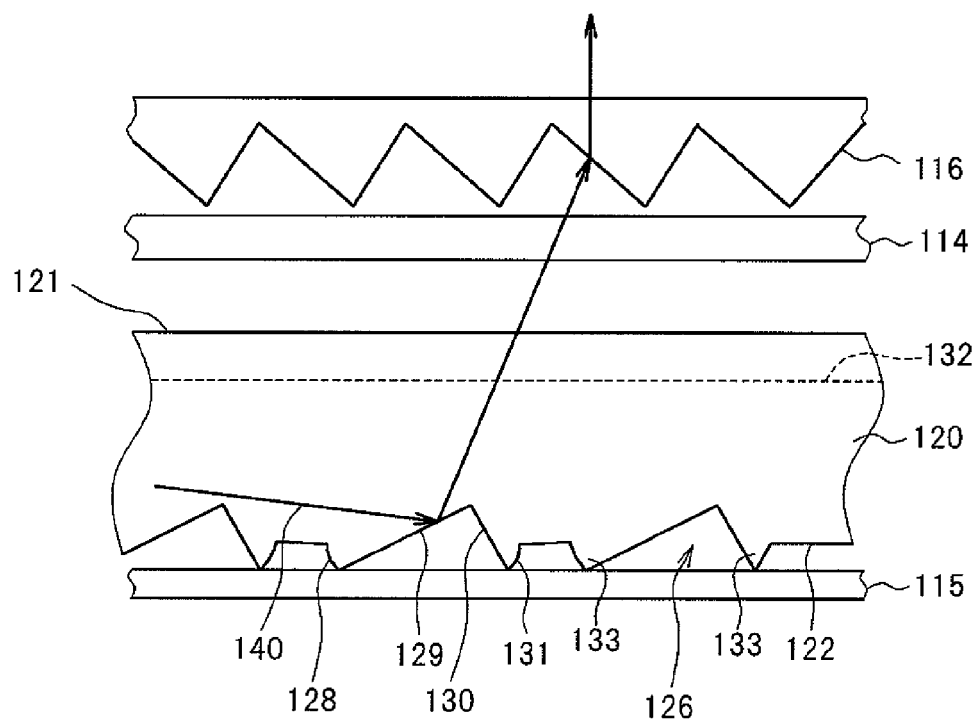
FIG. 7 illustrates a modification example of the light guide panel in terms of grooves.

FIG. 7 illustrates a modification example of the light guide panel 120 in terms of the groove 126. As illustrated in FIG. 7, the first light reflection surface 129 and the back surface 122 of the groove 126 may form an angle different from that formed by the second light reflection surface 130 and the back surface 122. In this case, when the first light reflection surface 129 intersects with the back surface 122 at a shallow angle, the light beam 140 that has entered from the left of FIG. 7 outgoes mainly in a direction tilted to the right of FIG. 7 with respect to the vertical direction of the light outgoing surface 121. Provided above the light guide panel 120 through the diffusion plate 114 is an asymmetric prism sheet 116, which refracts the light beam 140 in a direction toward the front side of the light guide panel 120. With this configuration, the light beam 140 that enters the first light reflection surface 129 at a shallow angle is increased in ratio, with the result that the light beam 140 to be reflected toward the front side is increased in ratio, to thereby improve the use efficiency of the light beam 140. It should be noted that, even in this modification example, the prism sheet 113 may also be provided as in the previous example.

Figure 8:
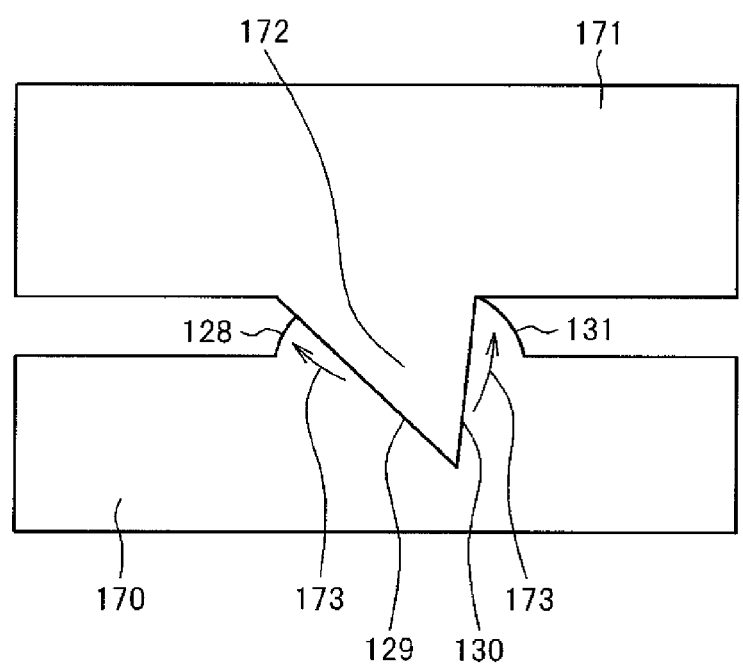
FIG. 8 is a diagram illustrating how to form the groove according to the modification example.

FIG. 8 illustrates how to form the groove 126 according to this modification example. FIG. 8 is different from FIG. 5 in that the rib 172 of the mold 171 is bilaterally asymmetric. Even in this case, the thermoplastic material forming the sheet 170 flows as illustrated by arrows 173, to thereby form the first raised surface 128 and the second raised surface 131 as free surfaces. Further, the first light reflection surface 129 and the second light reflection surface 130 are formed when contacting with the rib 172 of the mold 171.

Figure 9:
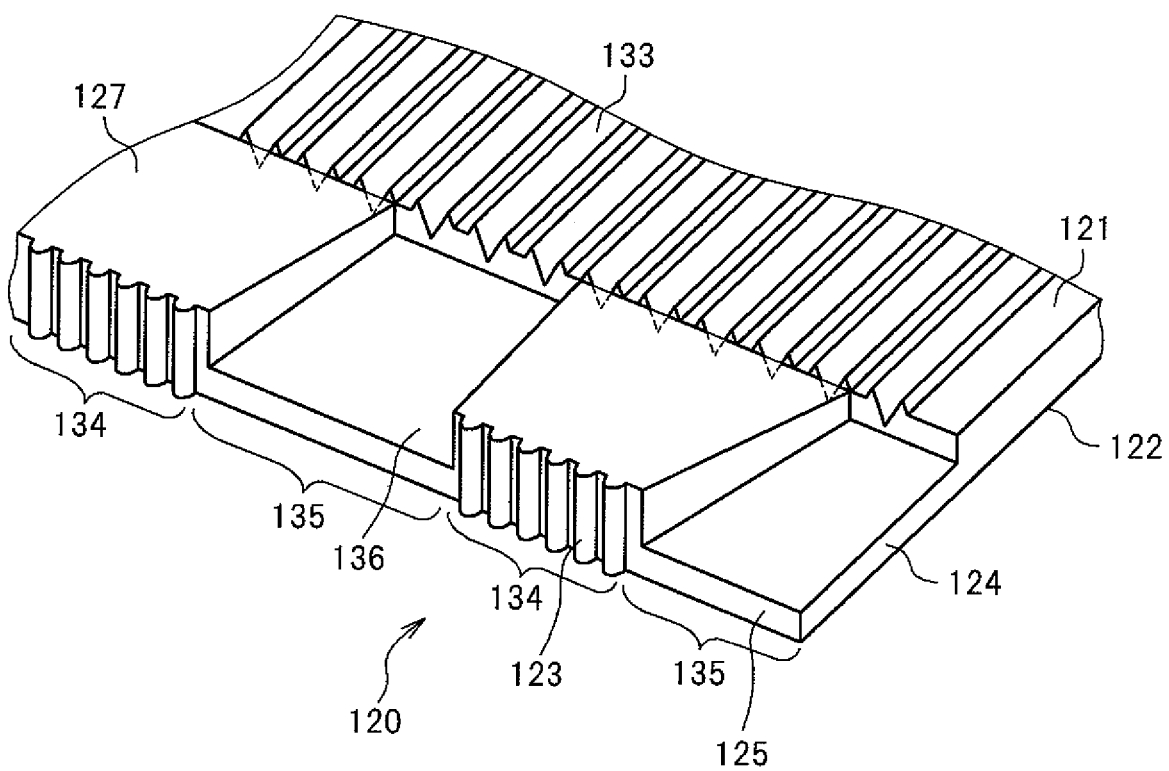
FIG. 9 is a perspective view illustrating the vicinity of the light incident surface of the light guide panel.

Next, description is given of the light guide panel 120 in terms of structure in the vicinity of the light incident surface 125 of the light guide panel 120. FIG. 9 is a perspective view illustrating the vicinity of the light incident surface 125 of the light guide panel 120. The light incident surface 125 is provided with a plurality of light introducing portions 134 and a plurality of light non-introducing portions 135. The light introducing portions 134 are each larger in thickness than the light guide panel 120. The light non-introducing portions 135 are formed at portions sandwiched by the light introducing portions 134 and at portions sandwiched the light introducing portion 134 and the edge portion of the light guide panel 120. The light non-introducing portions 135 are each smaller in thickness than the light guide panel 120. Accordingly, the light incident surface 125 is in a shape which has concave portions and convex portions formed on the front side of the light guide panel 120, when viewed from the normal direction of the light incident surface 125. At this time, the light introducing portion 134 corresponds to the convex portion while the light non-introducing portion 135 corresponds to the concave portion. The light introducing portion 134 continues, at the front edge side thereof, smoothly to the light outgoing surface 121 through the inclined surface 127. On the other hand, the light non-introducing portion 135 continues, at the front edge side thereof, to the light outgoing surface 121 in parallel with the light outgoing surface 121 through a concave surface 136, and a step is formed at the connecting portion. The light introducing portion 134 of the light incident surface 125 is provided with a lens 123. The lens 123 functions to scatter light entering from the light introducing portion 134. The light that has entered through the light introducing portion 134 is introduced to the light outgoing surface 121 through the inclined surface 127. The light introducing portion 134 and the light non-introducing portion 135 described above form the light incident surface 125, the inclined surface 127, and the concave surface 136, which form the light entering portion 124.

As described above, when the light introducing portion 134 is increased in thickness so as to be larger than the light guide panel 120, the light guide panel 120 which is smaller in thickness than the light-emitting diode 150 may be employed. Preferably, the light introducing portion 134 may be substantially equal in thickness to the light-emitting diode 150.

Figure 10A:
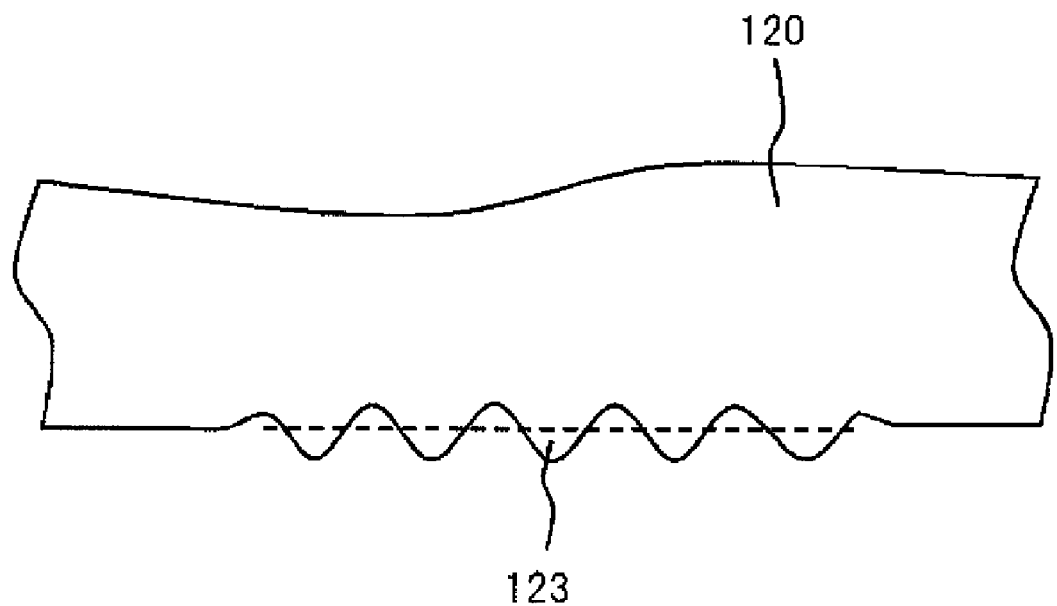
FIGS. 10A and 10B illustrate exemplary shapes of a lens.
Figure 10B:
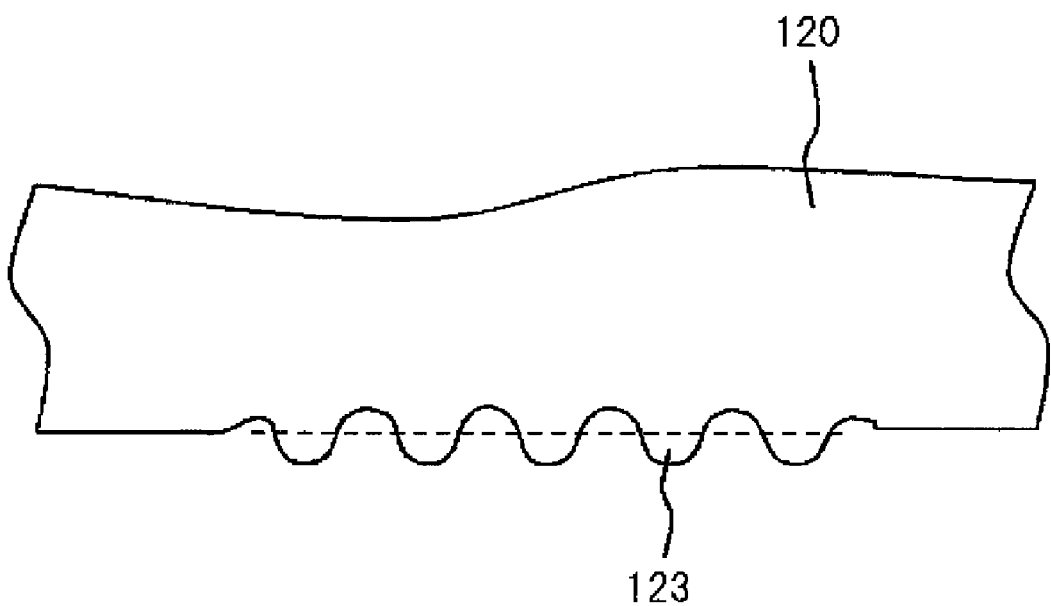

The lens 123 may be in various shapes, and preferably be in a shape drawn into the thickness direction of the light guide panel 120. The reason is that, as described later, the light guide panel 120 is punched out from the sheet 170 to be formed, and hence the lens 123 may be in a shape easy to punch out. For example, examples of the lens 123 include, a lens which is triangle in cross section as illustrated in FIG. 10A, and a lens formed of a plurality of semicircular cylindrical lenses connected to one another as illustrated in FIG. 10B. In view of the ease of fabrication, there may be preferably selected a lens with round corners, whereas the lens 123 may be in a shape of a conventional lenticular lens or in a shape with a sawtooth pattern.

Figure 11:
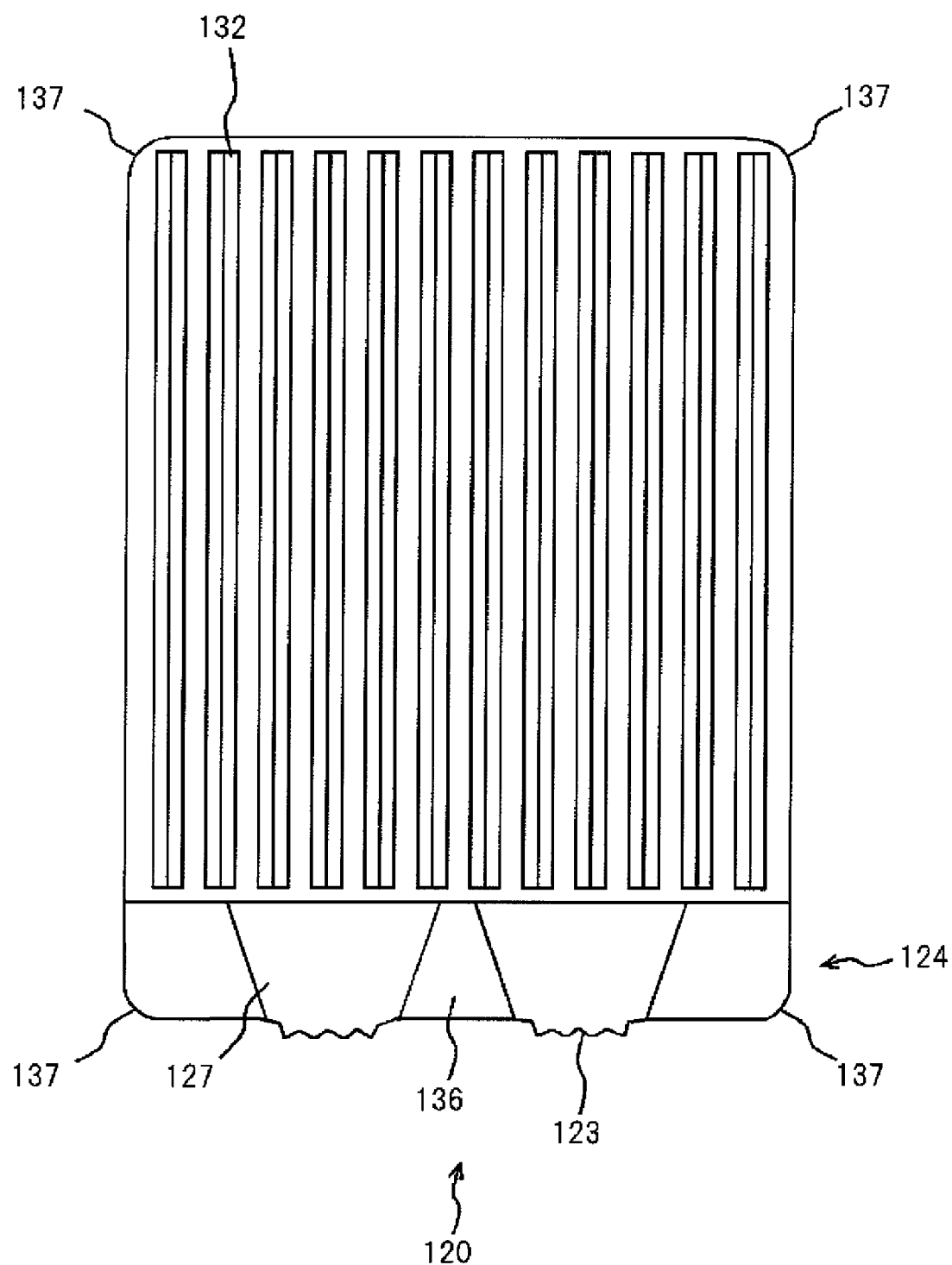
FIG. 11 is a plan view illustrating the light guide panel punched out from the sheet.

Next, description is given of a method of forming the light entering portion 124 and a method of manufacturing the light guide panel 120. The light entering portion 124 is formed by a method including the following steps. In a first step, the sheet 170 made of thermoplastic material is heated and softened (heating step). The heating temperature may be adjusted similarly to the case of forming the groove 126. At this time, the sheet 170 may preferably be larger in size than the light guide panel 120 to be obtained. Further, the sheet 170 may be the same in thickness as the light guide panel 120 to be obtained. In a second step, the sheet 170 is pressed with a mold (pressing step). The mold employed in this case as well may preferably be a metallic mold made of metal. The mold has a shape supplementary to the shape of the light entering portion 124 of the sheet 170. Accordingly, a portion of the thermoplastic material for forming the concave surface 136 of the sheet 170 is pressed and flows, and flows into a portion to be formed as the inclined surface 127 of the sheet 170. As a result, a portion for forming the light introducing portion 134 which is larger in thickness than the sheet 170 is formed. It should be noted that, at this time, the groove 126 and the groove 132 may be formed simultaneously, or may be formed in different steps, respectively. In a third step, the sheet 170 is removed from the mold (removing step). At this time, the sheet 170 may be cooled if necessary. In a fourth step, the periphery of the sheet 170 is cut out, to thereby obtain the light guide panel 120 having the light entering portion 124 (cutout step). FIG. 11 is a plan view illustrating the light guide panel 120 cut out from the sheet 170. The lens 123 is formed in this step. Further, in this embodiment, a punching process is employed as the cutout method, and hence the light guide panel 120 has corners 137 slightly rounded for the purpose of facilitating the process.

It should be noted that, in manufacturing the light guide panel 120 according to this method, the one light guide panel 120 may be obtained from the one sheet 170, or the light guide panels 120 may be cut out in large numbers from the one sheet 170, which is so-called multi-panel method. Alternatively, the light guide panel 120 may be manufactured through batch processing from the sheet 170 in a plate shape, or the sheet 170 may be wound off in a belt-like form from a roll of raw sheet and the light guide panel 120 may be manufactured therefrom in sequential processing. In such a case, an emboss roll may be employed as the mold.

Figure 12:
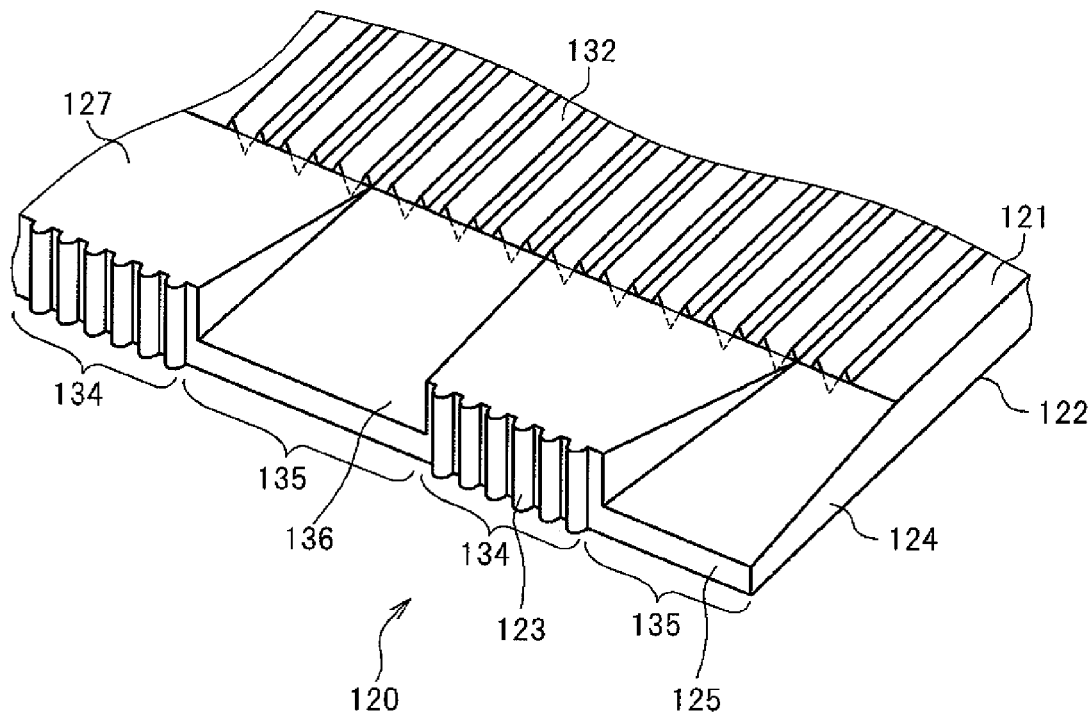
FIG. 12 illustrates a modification example of a light entering portion.
Figure 13:
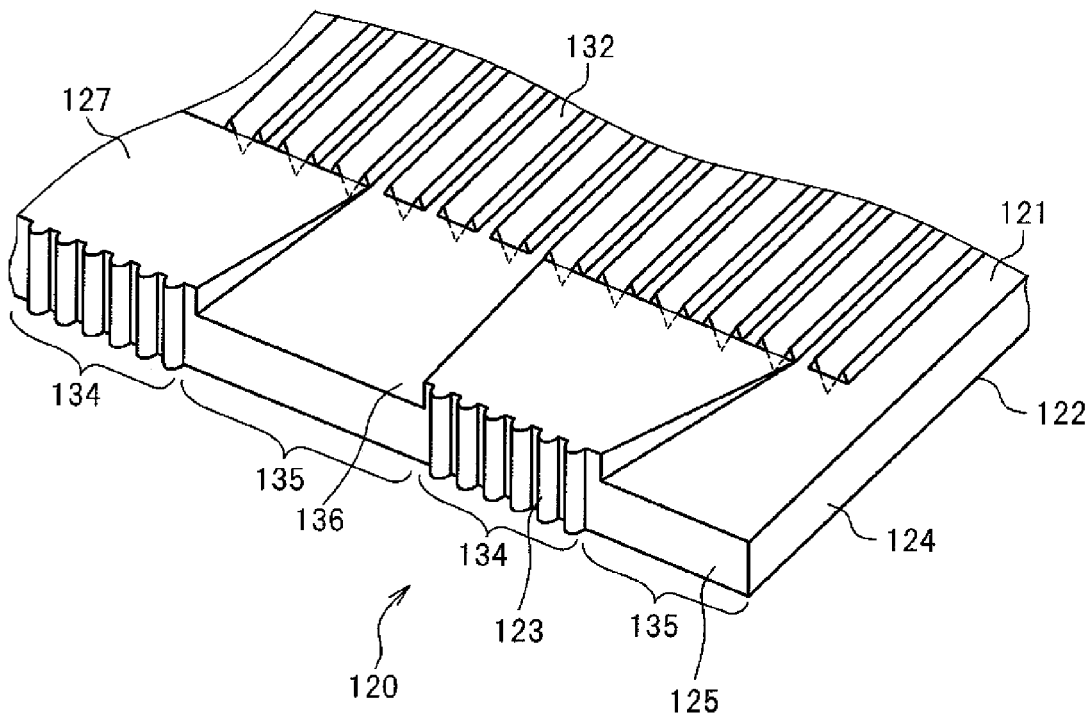
FIG. 13 illustrates another modification example of the light entering portion.

FIGS. 12 and 13 illustrate modification examples of the light entering portion 124. FIG. 12 illustrates an example where the concave surface 136 is formed as an inclined surface that continues smoothly to the light outgoing surface 121, and FIG. 13 illustrates another example where the concave surface 136 and the light outgoing surface 121 are formed on the same surface and the light non-introducing portion 135 is formed to have a thickness equal to that of the light guide panel 120. The example illustrated in FIG. 13 may be manufactured by pressing the sheet 170 at portions falling outside the light guide panel 120 so as to cause the thermoplastic material to flow toward the portion to be formed as the inclined surface 127.

Figure 14:
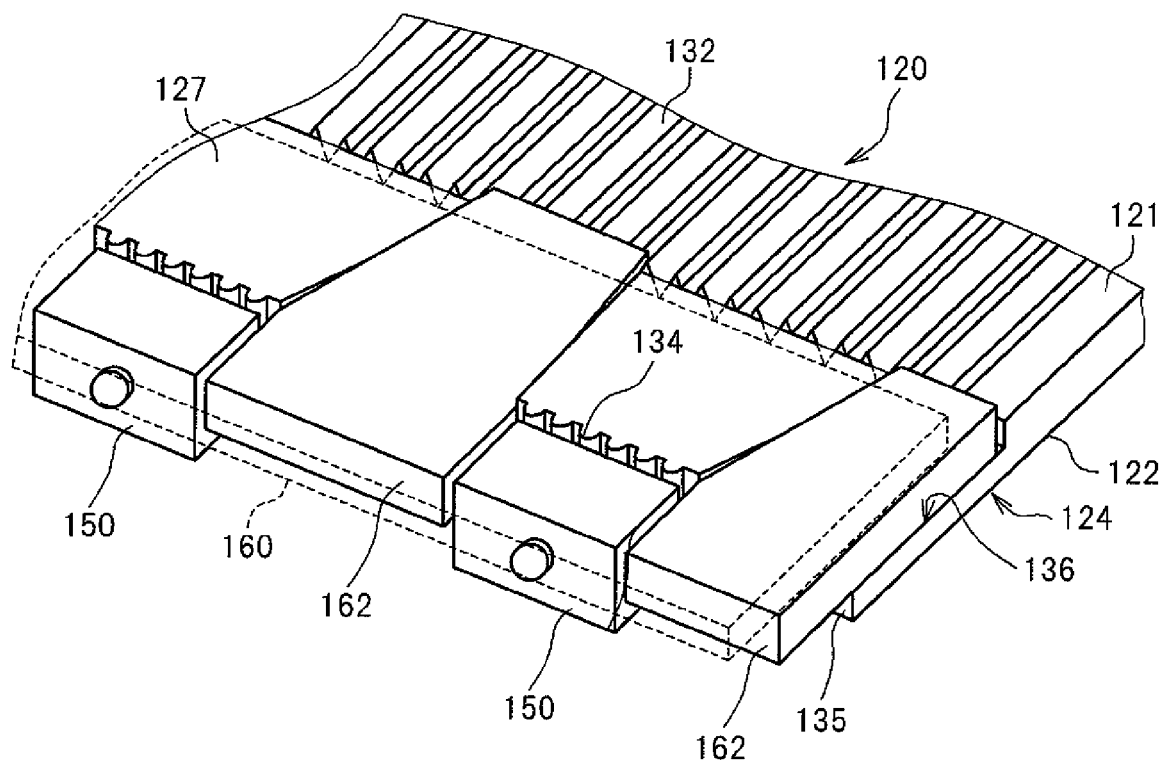
FIG. 14 illustrates an installation structure for installing the light-emitting diode in the light guide panel.

Next, description is given of an installation structure for installing the light-emitting diode 150 in the light guide panel 120. FIG. 14 illustrates an installation structure for installing the light-emitting diode 150 according to this embodiment in the light guide panel 120. The light-emitting diode 150 is attached to the back side of the flexible substrate 160, and disposed so as to surface the light introducing portion 134. The flexible substrate 160 is fixed to the light guide panel 120 through an intermediate member 162. It should be noted that FIG. 14 illustrates merely an outline of the flexible substrate 160 by dashed lines for ease in understanding.

As illustrated in FIG. 14, the intermediate member 162 is supplementary to the concave surface 136 in shape, and fixed to the concave surface 136 at the back surface thereof. In other words, the intermediate member 162 is fixed to the light outgoing surface 121, which is the front surface of the light guide panel 120, while being adjacent to the light non-introducing portion 135. Further, the intermediate member 162 is fixed, at the front surface thereof, to the flexible substrate 160. The thickness of the intermediate member 162 may preferably be substantially equal to a difference between the thickness of the light introducing portion 134 and the thickness of the light non-introducing portion 135. With this configuration, there is no need to provide a fixing structure between the flexible substrate 160 and the inclined surface 127, which is a front surface of the light introducing portion 134, with the result that the thickness of the installation structure is reduced by the amount corresponding to the fixing structure.

It should be noted that, in this embodiment, pressure-sensitive adhesive double coated tape is employed as the intermediate member 162. However, the present invention is not limited thereto, and the intermediate member 162 may be made of any other appropriate material. Further, the intermediate member 162 may not be required to be uniform in thickness. In a case where the concave surface 136 is an inclined surface as described above, the intermediate member 162 may be changed in thickness along the inclined surface. Still further, the flexible substrate 160 illustrated in FIG. 14 is in a rectangular form covering the light entering portion 124 and the light-emitting diode 150, but the present invention is not limited thereto. The flexible substrate 160 may be in any form as long as being capable of fixing the light-emitting diode 150 through the intermediate member 162.

Figure 15:
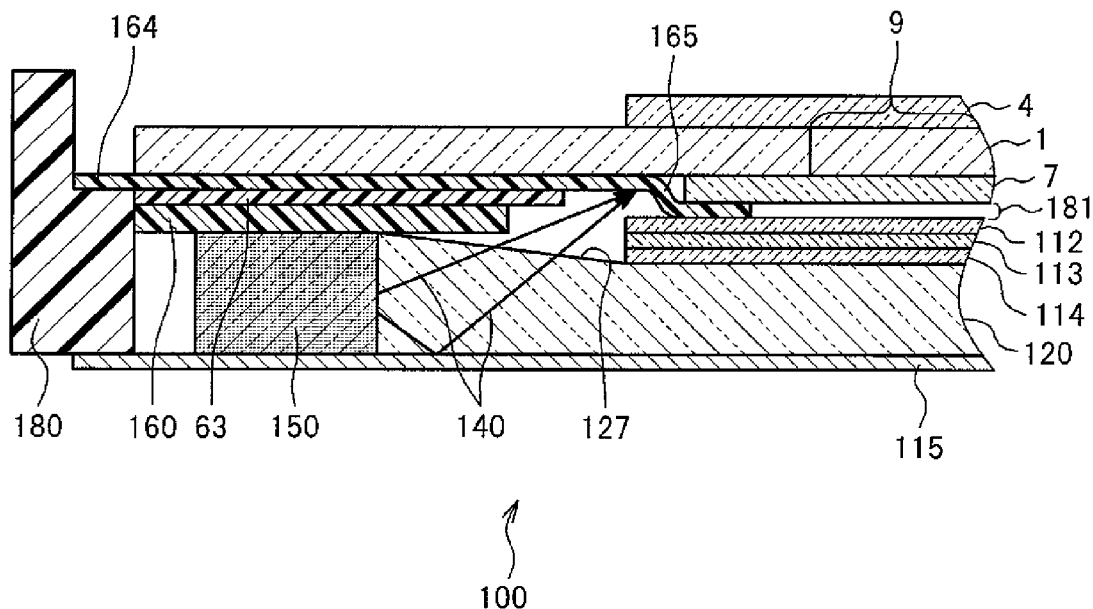
FIG. 15 is a cross-sectional view of the liquid crystal display device.

Further, description is given of a structure of preventing leakage of light from a light source. FIG. 15 is a cross-sectional view of the liquid crystal display device 100. FIG. 15 illustrates positional relations among the optical switching member 1, a polarizing plate 4 and a polarizing plate 7 attached to the front surface and the back surface, respectively, of the optical switching member 1, the light guide panel 120, the prism sheets 112 and 113 and the diffusion plate 114, which are optical sheets provided on the front surface of the light guide panel 120, the reflective sheet 115, the light-emitting diode 150, and the flexible substrate 160. The optical switching member 1 and the flexible substrate 160 are received by the housing 180 through a light blocking member 164. A spacer 163 may be inserted between the light blocking member 164 and the flexible substrate 160 as necessary, and a space 181 of a predetermined width is provided at a position corresponding to the display area 9.

The light blocking member 164 has a function of preventing light from entering the display area 9 from outside, and may preferably employ pressure-sensitive adhesive double coated tape in black. The light blocking member 164 is in a square frame-like form in plan view, and fixes the optical switching member 1 and the light guide panel 120 along the entire periphery thereof to the housing 180. In this embodiment, the light blocking member 164 has an extending portion 165 which is extended like a tongue from a position corresponding to the light-emitting diode 150 in an optical axis direction of the light-emitting diode 150. Then, the extending portion 165 is warped downward in a direction away from the optical switching member 1 on the back surface side thereof, and fixed to the prism sheet 112 as illustrated. In other words, the extending portion 165 is indirectly fixed to the light guide panel 120 through the prism sheets 112 and 113, and the diffusion plate 114. Alternatively, the extending portion 165 may directly be fixed to the light guide panel 120. Further, the opposite surface or the front surface of the extending portion 165 may be or may not be fixed to the polarizing plate 7.

When the extending portion 165 as describe above is provided, as illustrated in the drawing, the light beam 140 radiated from the light-emitting diode 150 and leaked out on the front side from the inclined surface 127 is shielded by the extending portion 165 and does not reach the display area 9.

Figure 16:
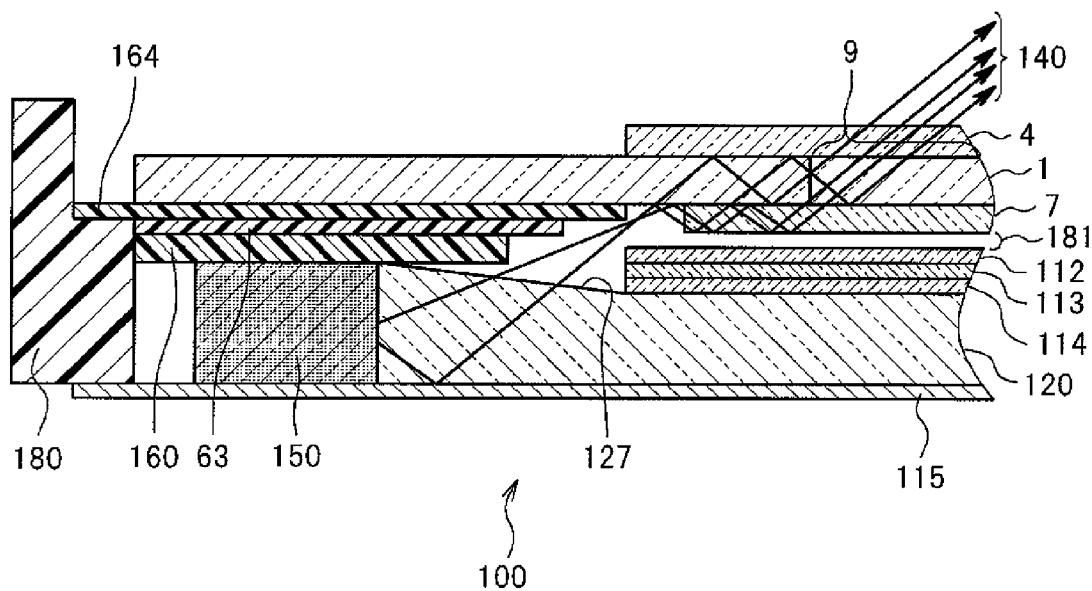
FIG. 16 is a reference cross-sectional view of the liquid crystal display device in which an extending portion is not provided.

In order to facilitate the understanding of this effect, description is given of a reference example illustrating a case where the liquid crystal display device 100 of this embodiment is not provided with the extending portion 165. FIG. 16 is a reference cross-sectional view of the liquid crystal display device 100 in which the extending portion 165 is not provided. In the reference example, the same reference numerals are used to denote the members similar to those in this embodiment, and the detailed description thereof is omitted.

As is apparent from FIG. 16, when the extending portion 165 is not provided, the light beam 140 radiated from the light-emitting diode 150 and leaked out on the front side of the inclined surface 127 enters the optical switching member 1 or into the polarizing plate 7, and is likely to reach the display area 9 after being repetitively reflected. Accordingly, there is a fear that the display area 9 may suffer unevenness in luminance if the extending portion 165 is not provided.

Figure 17A:
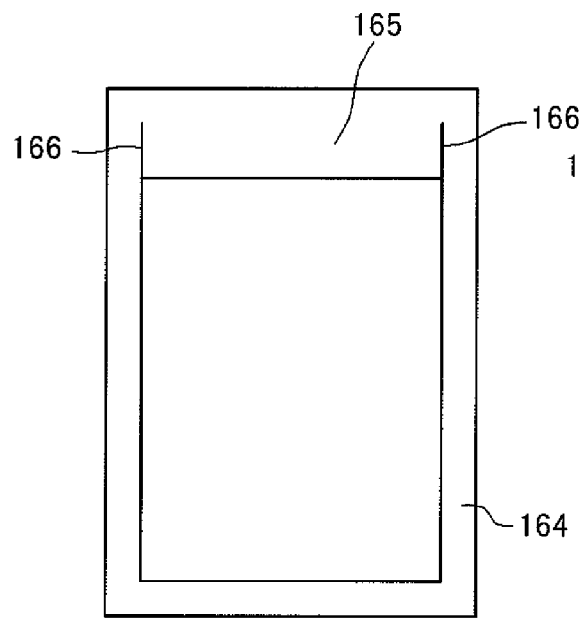
FIGS. 17A, 17B, 17C, and 17D illustrate various shapes of a light blocking member.
Figure 17B:
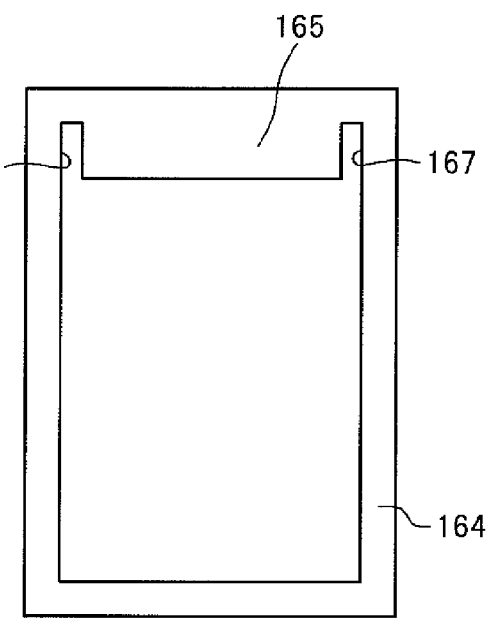
Figure 17C:
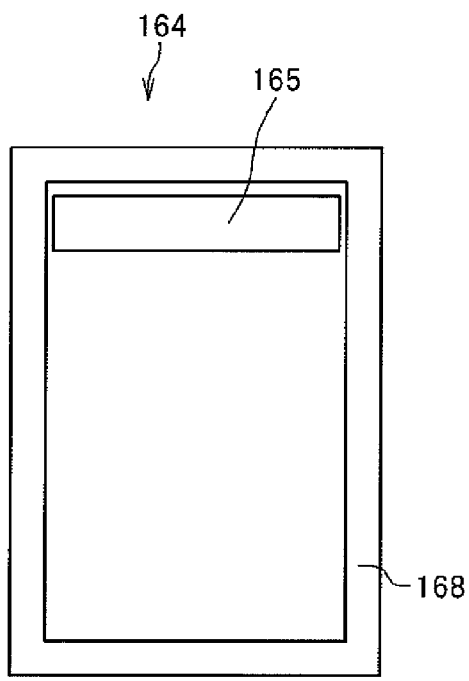
Figure 17D:
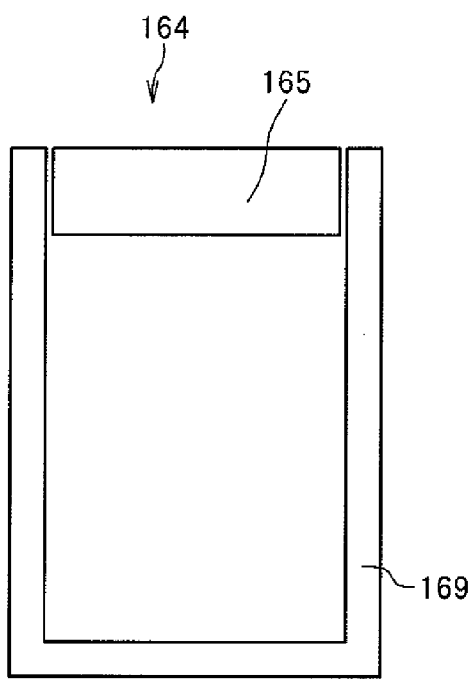

FIGS. 17A, 17B, 17C, and 17D illustrate various shapes of a light blocking member 164. FIG. 17A illustrates an example where the light blocking member 164 in a square frame-like form is provided with cutoff portions 166 at both end portions on one side of a rectangular opening, the cutoff portions 166 extending toward the outer side of the light blocking member 164, to thereby form the extending portion 165. FIG. 17B illustrates another example where the light blocking member 164 in a square frame-like form is provided with notch portions 167 of a predetermined width at both end portions on one side of a rectangular opening, the notch portions 167 extending toward the outer side of the light blocking member 164, to thereby form the extending portion 165. FIG. 17C illustrates further another example where an outside member 168 in a square frame-like form is provided with the rectangular extending portion 165 as a separate member, which is provided inside the outside member 168, to thereby form the light blocking member 164. FIG. 17D is further another example where an outside member 169 in a U-shaped form is provided with the rectangular extending portion 165 as a separate member, which is provided inside the outside member 169, to thereby form the light blocking member 164. The light blocking member 164 may be in any form as long as being capable of fixing the optical switching member 1 and the light guide panel 120 along the entire periphery thereof to the housing 180 while capable of shielding the light beam 140 leaked out on the front side from the inclined surface 127, including the forms illustrated in FIGS. 17A, 17B, 17C, and 17D, and any other form.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   an optical switching member which includes a first substrate and a second substrate sandwiching a liquid crystal layer;
   a light guide panel made of a thermoplastic material disposed on a back side of the optical switching member; and
   a light source disposed on at least one side of the light guide panel,
   the light guide panel comprising, on at least one of a front surface and a back surface thereof, a plurality of surface structures including:
      a first raised surface extending outward from the at least one of the front surface and the back surface;
      a first light reflection surface which continues from the first raised surface and enters inside the at least one of the front surface and the back surface, from the first raised surface;
      a second light reflection surface which continues from the first light reflection surface and extends outside the at least one of the front surface and the back surface, from the first light reflection surface; and
      a second raised surface which continues from the second light reflection surface and further continues, from the second light reflection surface, to the at least one of the front surface and the back surface;
   wherein, of the plurality of surface structures, the thermoplastic material locating outside the at least one of the front surface and the back surface is equal in volume to a void portion formed inside the at least one of the front surface and the back surface.

2. The liquid crystal display device according to claim 1, wherein:
   the first light reflection surface and the second light reflection surface are formed of the thermoplastic material which has flown when the light guide panel is pressed with a mold so that the mold is brought into contact with the thermoplastic material; and
   the first raised surface and the second raised surface are formed of the thermoplastic material, which has flown without contacting with the mold when the light guide panel is pressed with the mold.

3. The liquid crystal display device according to claim 1, wherein the plurality of surface structures are formed on the front surface and the back surface of the light guide panel in a linear fashion as being orthogonally oriented to each other.

4. The liquid crystal display device according to claim 1, wherein the first light reflection surface intersects with the at least one of the front surface and the back surface at an angle different from an angle at which the second light reflection surface intersects with the at least one of the front surface and the back surface.

* * * * *